Figure 1:
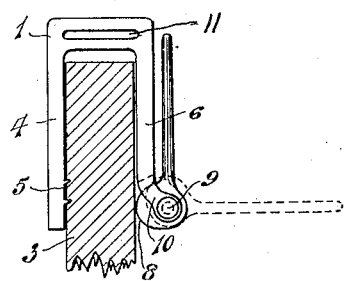

E. MORRISON.
CLIP FOR ATTACHING A STRAP TO A FRUIT CASE OR THE LIKE.
APPLICATION FILED DEC. 16, 1918.

1,355,997.

Patented Oct. 19, 1920.

Inventor:
Edward Morrison,
per H. W. Plucker
Attorney.

UNITED STATES PATENT OFFICE.

EDWARD MORRISON, OF WARKWORTH, AUCKLAND, NEW ZEALAND.

CLIP FOR ATTACHING A STRAP TO A FRUIT-CASE OR THE LIKE.

1,355,997.     Specification of Letters Patent.     Patented Oct. 19, 1920.

Application filed December 16, 1918. Serial No. 266,986.

*To all whom it may concern:*

Be it known that I, EDWARD MORRISON, a citizen of the Dominion of New Zealand, and residing at Hepburns Creek Road, Warkworth, Auckland, in the Provincial District of Auckland, in the Dominion of New Zealand, have invented certain new and useful Improvements in Clips for Attaching a Strap to a Fruit-Case or the like, of which the following is a specification.

This invention provides a clip whereby a strap may be readily attached to a fruit case, the strap being passed over the shoulders of a fruit picker to suspend the case in front of the picker while gathering fruit and depositing the same in the fruit case.

The drawing herewith illustrates the invention:—

Figure 1 is a side elevation, and

Figure 2:
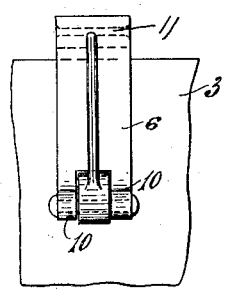

Fig. 2, a front elevation.

The clip 1 is made with a jaw sufficiently wide to admit freely the rim of a fruit case 3.

The side member 4 of the jaw is provided with teeth 5 on its inner face, and the other side member 6 is provided opposite the teeth 5 with gripping means, said means consisting of a cam 8 pivoted on a pin 9 in a jaw 10 formed on the side 6.

The upper part of each clip 1 is provided with a slot 11, through which one end of a strap is looped and secured by stitching, or otherwise.

A clip is provided at each end of the strap and secured upon the ends of the case by the cam 8.

What I do claim and desire to secure by Letters Patent of the United States is:—

A clip for attaching a strap to a case comprising jaws having a pair of rigid side members, a right angle connecting piece therebetween, projecting teeth on the inner face of one of the side members, a gripping device on the other member consisting of a cam piece having a handle adapted to lie closely against the side member when in the gripping position and to project outward when unlocked and having a cam face for engaging the case, and a slot extending the full length of the connecting piece for engaging the end of the strap.

In testimony whereof I have signed my name to this specification in the presence of two witnesses.

EDWARD MORRISON.

Witnesses:
     D. JNO. CONNELL,
     C. WALLACE.